United States Patent
Nejatian et al.

(10) Patent No.: US 8,805,284 B2
(45) Date of Patent: Aug. 12, 2014

(54) INTERFERENCE IDENTIFICATION AND MITIGATION IN WIRELESS COMMUNICATION

(75) Inventors: Alireza Nejatian, Uppsala (SE); Krister Sundberg, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 343 days.

(21) Appl. No.: 13/034,467

(22) Filed: Feb. 24, 2011

(65) Prior Publication Data
US 2012/0028663 A1 Feb. 2, 2012

Related U.S. Application Data

(60) Provisional application No. 61/369,242, filed on Jul. 30, 2010.

(30) Foreign Application Priority Data

Feb. 24, 2011 (SE) .................. PCT/SE2011/050215

(51) Int. Cl.
*H04B 1/00* (2006.01)
*H04B 15/00* (2006.01)

(52) U.S. Cl.
USPC .......... 455/63.1; 375/345; 375/346; 375/343; 455/501; 455/240.1; 455/63.3

(58) Field of Classification Search
CPC ...... H04B 1/109; H04B 15/00; H04B 1/1027; H04B 1/1036
USPC .................................. 455/63.1, 65, 67.13, 69
See application file for complete search history.

(56) References Cited

U.S. PATENT DOCUMENTS

| | | | | |
|---|---|---|---|---|
| 6,408,168 | B1* | 6/2002 | Sessink ...................... | 455/250.1 |
| 7,263,143 | B1* | 8/2007 | Rothaar et al. ................ | 375/345 |
| 7,599,671 | B2* | 10/2009 | Kopikare et al. ............. | 455/130 |
| 7,773,014 | B1* | 8/2010 | Wu et al. ....................... | 341/139 |
| 2006/0222116 | A1* | 10/2006 | Hughes et al. ................ | 375/345 |
| 2010/0022263 | A1* | 1/2010 | Stamoulis et al. ............ | 455/501 |
| 2012/0026985 | A1* | 2/2012 | Ren et al. ...................... | 370/336 |

FOREIGN PATENT DOCUMENTS

EP       1 752 787 A2    2/2007

OTHER PUBLICATIONS

International Search Report and Written Opinion mailed Jun. 20, 2011 in corresponding Application No. PCT/SE2011/050215 (10 pages).
Awele Ndili et al.; "GPS Receiver Autonomous Interference Detection", 1998 IEEE Position, Location and Navigation Symposium—PLANS '98, Palm Springs, CA, Apr. 1998 (8 pages).
Frederic Bastide et al., "Automatic Gain Control (AGC) as an Interference Assessment Tool", ION GPS/GNSS 2003, Portland, OR, Sep. 9-12, 2003 (pp. 2042-2053).

* cited by examiner

*Primary Examiner* — Edward Urban
*Assistant Examiner* — Max Mathew
(74) *Attorney, Agent, or Firm* — Nixon & Vanderhye, P.C.

(57) ABSTRACT

Interference in a wireless communication system receiver, such as at a base station, is identified based on monitoring automatic gain control (AGC) events. AGC statistics in combination with base band processing are used to identify the interference. Performance degradation is evaluated, and interference mitigation solutions are proposed based on the identified interference. Mitigation solutions include IRC, scheduling restrictions, and filter modifications including replacement of filters.

29 Claims, 15 Drawing Sheets

INTERFERENCE IDENTIFICATION AND MITIGATION IN WIRELESS COMMUNICATION

RELATED APPLICATION

This application claims the priority and benefit of U.S. provisional patent application 61/369,242 entitled "INTERFERENCE IDENTIFICATION AND MITIGATION METHOD IN LTE SYSTEM" filed Jul. 30, 2010, and also claims the priority and benefit of International. Application. No. PCT/SE2011/050215 filed Feb. 2, 2011, which is incorporated herein. by reference in its entirety.

TECHNICAL FIELD

Technical field of present disclosure relates to wireless communications, and in particular to identifying and mitigating interference in wireless communications.

BACKGROUND

Long Term Evolution (LTE) is the name of the 3rd Generation Partnership Project (3GPP) evolution of the Universal Mobile Telecommunications System (UMTS) Terrestrial Radio Access and Radio Access Network (UTRAN), published in 3GPP Release 8 and subsequent specification.

LTE is based upon OFDMA (Orthogonal Frequency Division Multiple Access) in DL (downlink) and SC-FDMA (Single Carrier Frequency Division Multiple Access) in UL (uplink) using modulations up to 64-QAM (Quadrature Amplitude Modulation). The sub carrier separation is 15 KHz and the possible bandwidth allocations range from 1.4 MHz to 20 MHz, and even more in case of aggregation.

A requirement on the LTE standard is that it should be simpler to deploy and manage than previous 3GPP standards such as GSM (Global System for Mobile Communications) and WCDMA (Wide Code Division Multiple Access). LTE should also be compatible with these systems meaning, in other words, that there is full support for handover between the new and old standards. Spectrum usage is also standardized. By creating new access technology and rolling out new systems, more interference is added to already existing interference which may cause performance degradation to some or all systems.

A topic of ongoing discussions in the industry is how to also combine and reuse as much hardware as possible between the systems. Hardware reuse can be considered at three levels:
1. A common cabinet;
2. A common radio (multi-standard radio, or MSR); and
3. A common digital part.

In the multi-standard products, different standards are expected to share cabinet and radio. They may even share digital parts at some point, but not necessarily initially. This implies that a common radio would be capable of performing different RATs (radio access technology) radio functionality at the same time. In a mixed RAT, different standards functionality is based on frequency multiplexing. In a Mixed RAT mode defined by 3GPP, the radio handles at least two RATs both in TX (transmit) and RX (receive) chains simultaneously. Radio chains include different components performing functions such as filtering, signal amplification, up/down RF (radio frequency) conversion to/from base band frequency and gain control among others.

In a geographical area in which different uncoordinated RATs operate, in addition to large number of base stations and mobile stations, there will be a lot of different signals in the air. Some of these signals are desired for a specific base station, functional in a specific RAT. But at the same time, these same signals represent interference for other base stations and RATs. FIG. 1 depicts a representative area in which numerous base stations—which may operate in different RATs—communicate with numerous mobile stations. The solid lines represent the desired signals, while the dashed and dotted lines are considered as interferences.

The interfering signals that come into the RX chain cause performance degradation. To mitigate performance degradation, reducing interference in the receiver is necessary, which can be accomplished with different methods. These methods in general can be categorized as filtering and dynamic mitigation. In the filtering method, interference is attenuated. This method is based on predetermined interference level to which the interference needs to be attenuated so that performance degradation is prevented or minimized. Filtering to attenuate the interference can be implemented in several stages, e.g., in duplex and channel filters.

In dynamic mitigation, the RX gain is a function of a level of interference and is changed in different levels via AGC (Automatic Gain Control) functionality.

There are advantages and disadvantages in both mitigation methods regarding cost and performance. Normally, the most efficient way to mitigate interference is the filtering method that attenuates the interference level down to the predetermined low power levels. This low power level is determined in the design phase and all filtering would be based on this level. Generally, RBSs (radio base station, also referred to as Node B, eNodeB) are designed using both filtering and dynamic methods to handle interferences.

Interference causes performance degradation by adding more noise to the system, which results in a lower throughput. Remedying performance degradation due to interference means stopping or reducing the incoming power level of the interfering signals to the system. Conventionally, this is done by one of the ways mentioned above: filtering or dynamic mitigation. The filtering method means that a chain of filtering in RX is needed to attenuate the interference to a predetermined low power level. The dynamic method is based on changing the RX gain, which depends on component characteristics such as the IIP3 (third-order input intercept point), gain and so on. Both methods can be combined, but the filtering method is preferred since the dynamic method typically adds more noise to the system.

Filtering is performed in at least two stages: duplex filtering (also referred to as band pass filtering) and channel filtering in both analog and digital domains. A duplex filter is a high performing filter that extracts a specific operating band while a channel filter filters wanted signals. The duplex filter is usually used to reduce out-of-band interferences. This means that the duplex filter cannot filter in-band interferences, which is a situation that can be exacerbated in case of an MSR due to several standards.

The filtering method is based, as mentioned above, on reducing assumed interference level to a predetermined low power level. The problem with conventional filtering is that it requires high performance duplex filters to reduce the out-of-band interference, which often are over dimensioned and expensive in practice.

There are several deficiencies associated with conventional filtering. First, the filters are dimensioned to cope with a worst case scenario in terms of near/adjacent interference rejection.

But in reality, many sites do not experience such levels of near/adjacent interferences. As a result, the filtering capacity is excessive for many sites resulting in expenditure of unnecessary costs.

Second, the character of the interferences can change over time, and it is all but impossible to anticipate all types of interferences that a site will experience. As a result, the existing filter may not offer any protection from new interferences that arise.

SUMMARY

A non-limiting aspect of the disclosed subject matter is directed to a method to identify and mitigate interferences. The method may be performed at one or more nodes of a wireless communication system. The method comprises the steps of monitoring automatic gain control events occurring at the base station due to incoming signals over a predetermined time duration, generating AGC statistics of the AGC events in combination with a base band processing of a radio access technology operating in the base station, identifying an interference based on the AGC statistics; evaluating a performance degradation at the base station due to the identified interference, and proposing one or more interference mitigation solutions based on the performance degradation. In the method, the AGC statistics include statistics of AGC triggered states and AGC non-triggered states.

Another non-limiting aspect of the disclosed subject matter is directed to an interference mitigation entity of a wireless communication system arranged to identify and mitigate interferences. The interference mitigation entity comprises an AGC monitoring unit arranged to monitor automatic gain control (AGC) events occurring at the base station due to incoming signals over a predetermined time duration, an AGC statistics generating unit arranged to generate AGC statistics of the AGC events in combination with a base band processing of a radio access technology operating in the base station, an interference identifying unit arranged to identify an interference based on the AGC statistics, a performance evaluating unit arranged to evaluate a performance degradation at the base station due to the identified interference, and a mitigation proposing unit arranged to propose one or more interference mitigation solutions based on the performance degradation. The AGC statistics include statistics of AGC triggered states and AGC non-triggered states.

Yet another non-limiting aspect of the disclosed subject matter is directed to a non-transitory computer storage medium which has stored therein programming instructions. When a computer executes the programming instructions, the computer executes the above described method to identify and mitigate interferences.

Some advantages of the disclosed subject include: capabilities to identify interference levels and locations on already installed base stations, propose different solutions to mitigate performance degradations due to interferences, provide better control over interferences, provide simpler filter designs, and save cost and time among others.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
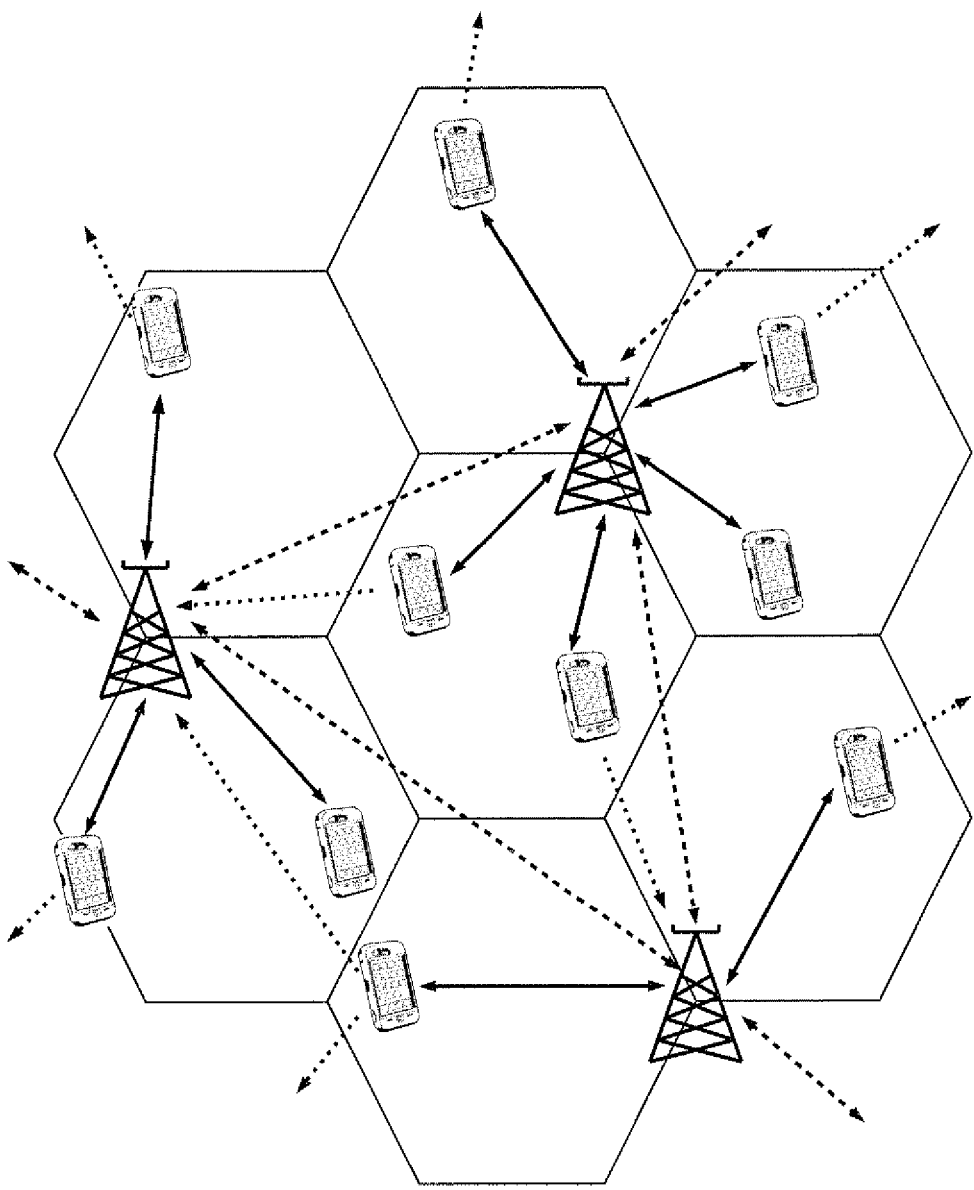
FIG. 1 illustrates a representative area in which numerous base stations operating in different radio access technologies communicate with numerous mobile stations.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP, and in particular LTE, is primarily used as examples for explanation purposes. However, the scope of this disclosure is not limited to the set of 3GPP wireless network systems and can encompass many domains of wireless network systems. Also, a base station (e.g. RBS, Node B, eNodeB) will be used as an example of a network node that performs the interference mitigation. However, it should be noted that the disclosed subject matter is applicable to any node, such as relay stations, in which interferences can be of issue.

It can be seen that detecting and mitigating the impact of interference causing performance degradation is a major challenge in managing and operating a cellular communication system, especially as the interference increases by simultaneous operation of multiple RATs in a single base station.

Figure 2:
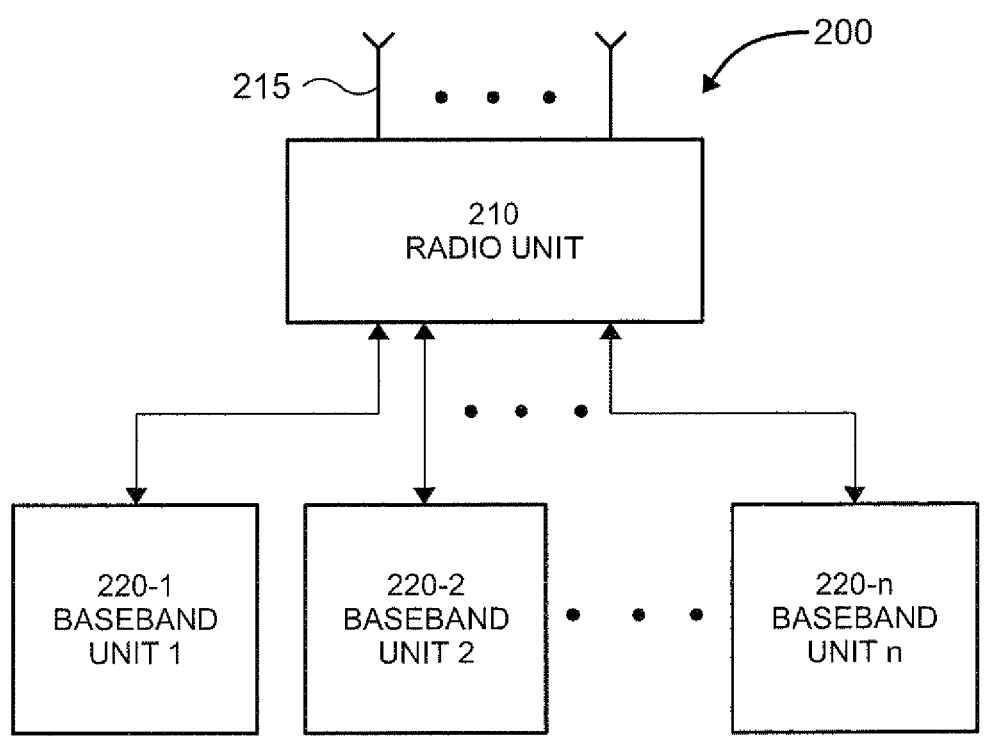
FIG. 2 illustrates an example base station in which a common multi-standard radio is shared among multiple radio access technologies.

As mentioned above, different standards are expected to share cabinet and radio. FIG. 2 is a block diagram illustrating an example base station in which a common radio—an MSR—is shared among multiple RATS. As seen, the base station 200 includes a radio unit 210 operatively coupled to one or more antennas 215. The radio unit 210 is configured to transmit and receive wireless signals to user equipments (UE) via the antennas 215. Being an MSR unit, the radio unit 210 is capable of transmitting and receiving signals over a wide range of frequencies and capable of performing different RATs simultaneously.

The base station 200 also includes a plurality of base band (BB) units 220-1 to 220-n. For example, the BB unit 220-1 may be an LTE BB unit, the BB unit 220-2 may be a GSM BB unit, and yet another may be a WCDMA BB unit. Each BB unit 220 performs base band processing for at least one RAT. That is, each BB unit 220 processes data from a network interface (not shown) such as encoding and base band modulating, and provides the processed information to the radio unit 220 so that the data are upconverted to an RF (radio frequency) signal in the radio unit 210 and transmitted to the UEs via the antennas 215. The BB units 220 also work in the other direction to demodulate data received from the UEs and provide the received data to its respective network interface.

Note that FIG. 2 is a logical representation of the BB units 220. Thus, each BB unit 220 need not be physically separate from any other BB unit 220. It is fully contemplated that multiple BB units 220 may be integrated into a single physical device. Further, each BB unit 220 may be implemented in multiple physical components operatively coupled to each other to perform the respective base band processing. Yet further, to the extent that some of the base band processing are similar between any two or more RATS, multiple BB units 220 may share these common components.

There are some compelling reasons for using the Mixed RAT mode. Among them is the fact that the radio frequency spectrum is a scarce resource. Thus, it is desirable to make optimal use of this resource. Newer RATs, e.g. LTE, which make more efficient use of the available spectrum allows the spectrum use to be optimized. But it is also important to provide service to users of old RATs such as GSM and CDMA. Mixed RAT mode enables both of these goals to be met. Another benefit of a Mixed RAT mode base station is that the costs can be reduced compared to the costs of installing, operating and maintaining multiple base stations each operating in a single RAT.

Figure 3:
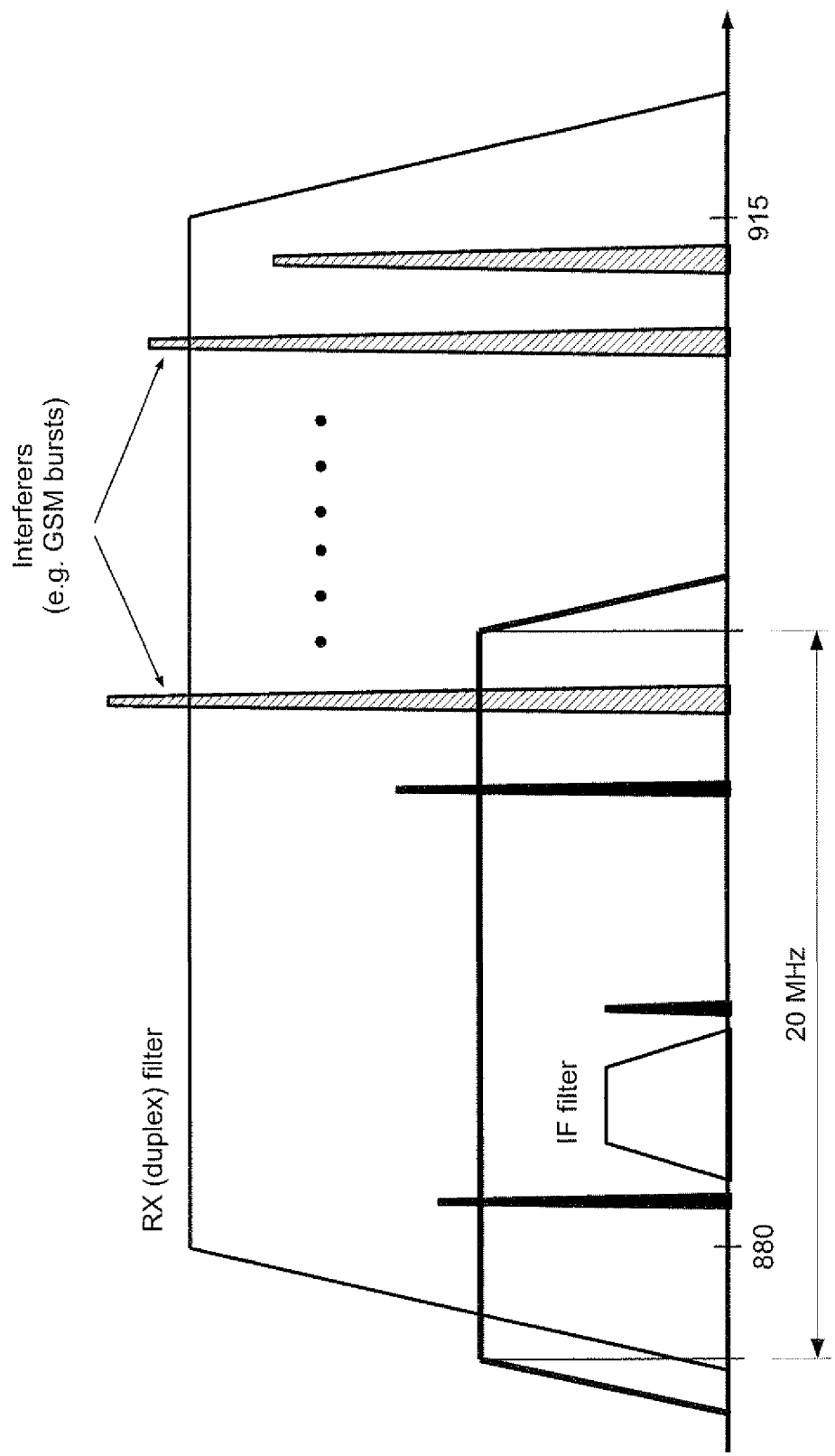
FIG. 3 depicts an example of interfering signals received directly into the reception band of a receiver.

Protecting a system from interferences can be done in several ways. One common is to design the hardware component in such way that it protects the system from unwanted incoming signals. The performance degradation can be caused by interfering signals received into the reception band of the receiver. FIG. 3 depicts an example of such interfering signals. A radio unit normally includes a duplex filter that attenuates signals whose frequencies are outside of a predetermined range. When signals received at the receiver are within the frequency range of the duplex filter and are of sufficient strength, they can trigger AGC events.

In FIG. 3, the duplex filter in the receiver is shown to attenuate, at least partially, signals outside of frequencies between 880 and 915 MHz. If the received signals—marked as heavy vertical lines—are of sufficient strength, these signals would trigger the AGC events. Note that if the duplex filter provides insufficient attenuation of frequencies even outside of its designed range, the out-of-duplex-filter-band signals of sufficient strength can also trigger AGC events.

For a single RAT base station, the duplex filter range can be set to the operating band of interest for an operator using a particular RAT such as the LTE. But in a mixed RAT base station with a common MSR, the band pass frequency range of the duplex filter (or simply the frequency range) should be inclusive of operating bands of all RATs being used in the base station. Thus, the duplex filter frequency range can be wider than the band of interest for any one operator. Thus, from the perspective of one operator, the duplex filter may not sufficiently attenuate out-of-band signals. This is depicted in FIG. 3 in which the frequency range of the duplex filter is wider than 20 MHz wide operating band of interest for a particular operator.

Also note that the operating bands of different operators may overlap to some extent in the mixed RAT base station. In FIG. 3, some GSM bursts are within the operating band of interest while other GSM bursts are outside of the operating band. These GSM bursts may be of sufficient strength to trigger the AGC in the receiver of the common radio unit.

Figure 4:
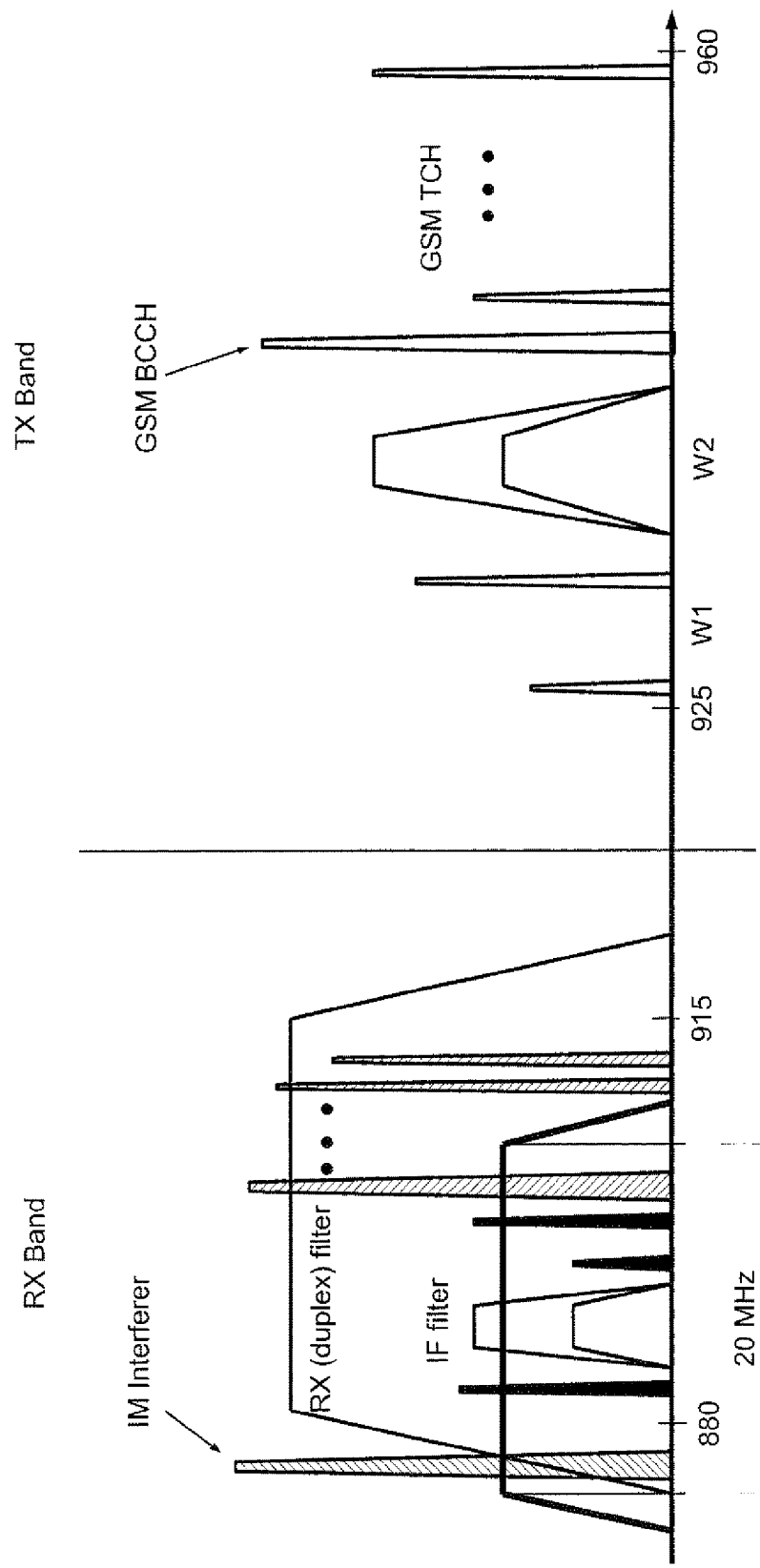
FIG. 4 depicts an example of interfering signals entering a receiver due to intermodulation.

The performance degradation can also be due to IM (intermodulation) production of different interfering signals with the base station's own TX signals. FIG. 4 depicts an example of such an IM produced signal. Intermodulation typically occurs as a result of signals mixing together, i.e., modulating one another, to produce signals that are not harmonic frequencies of the original frequencies. Problems arise when the frequencies of the IM produced signals are within the receiver duplex filter's frequency range.

In FIG. 4, the transceiver of the base station transmits signals at frequencies different from the frequencies of the received signals. In other words, the TX and RX bands are different. Nevertheless, a transmitted signal may intermodulate with other transmitted signals to produce IM signals that are within the RX band of the receiver. A TX signal can also intermodulate with incoming signals whose frequencies would normally be filtered by the duplex filter to produce interfering signals within the duplex filter frequency band. If these IM produced signals are of sufficient strength, they can also trigger AGC events.

As noted in the background section, one way to protect the system is to design a filtering system of the base station to handle all of these sources of interference. But also as indicated, there are problems with the existing filtering methods. Among them are:

Difficulties in designing a front end filter to suppress both in-band and out-of-band interferences;

Difficulties in locating the interferences in the frequency domain; and

Changes in interference characteristics over time.

It is all but impossible to anticipate all filtering needs for a base station. Also, designing the filtering capability of a base station using a worst case scenario may be excessive for deployment at a particular site.

Nonetheless, it is still desirable to ensure good service quality when the base station is installed and also while the base station is in-service. It is also desirable to be able to relax the filtering requirements so that costs of base stations can be reduced.

Figure 5:
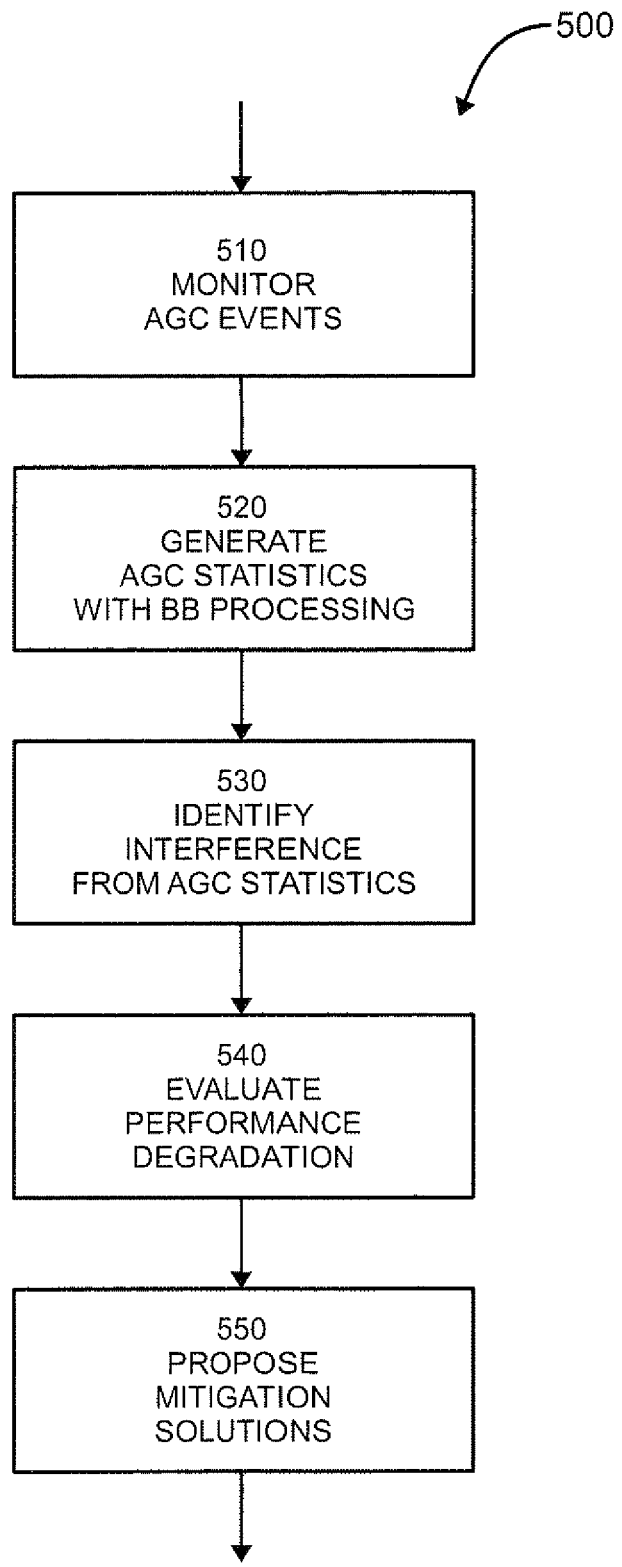
FIG. 5 illustrates an example method to identify and mitigate interferences.

In a non-limiting aspect to address at least the issues identified above, a method 500 for interference identification and mitigation is provided. As seen in FIG. 5, the method 500 comprises the steps of:

monitoring the AGC events occurring at the base station due to incoming signals over a predetermined time duration (step 510);

generating AGC statistics of the AGC events in combination with a base band processing of a radio access technology operating in the base station (step 520);

identifying the interferences based on the AGC statistics (step 530);

evaluating a performance degradation at the base station due to the identified interferences (step 540); and proposing one or more interference mitigation solutions based on the performance degradation (step 550).

The predetermined duration indicated in step 510 can be of any time duration such as an hour, a day, a week, and so on. This duration may be set by an operator. While there is no particular restriction on the duration, preferably it is set long enough such that the statistics gathered and the conclusions reached based on the statistics are meaningful.

While not explicitly indicated in FIG. 5, the steps 510-550 of the method 500 may be repeated. This allows ongoing identification and mitigation to be performed.

As indicated, the interferences are identified in real systems through supervising the AGC behavior of the base station's receiver. This allows interferences to be identified which are virtually impossible to predict during design.

In one implementation of the method, the AGC behavior with triggering due to incoming signals is supervised and statistics are gathered. The AGC statistics are used as indicators to identify interferences including their locations and problems in a vicinity of a carrier channel. Based on this information, decision is made on how to best mitigate the interference impact. Mitigation strategies include adjusting frequency, IRC (interference rejection combining), scheduling restrictions and other ways of utilizing the existing capabilities of the base station. If necessary, the base station's filtering capabilities can be extended.

The method is useful for already installed base stations as well as in the design of new base stations. First, for an already installed base station, the method can be used to remedy performance degradation. Second, during the base station design, the method may be used as an aid to find interferences, and thus enable the use of simpler duplex filters, and hence lead to less expensive base stations. This suggests that during the design phase, the worst case scenario—which may not occur or occur very infrequently—need not be considered. By default, base stations can be equipped with simple, less expensive filters, and extra filtering can be provided on an as needed basis.

Since the AGC statistics are used in the method to identify the interferences, this implies that the statistics should be inclusive of interfering signals that trigger the AGC events. Whenever an incoming signal of sufficient strength, e.g., above a predetermined threshold AGC_MIN, is received at the base station, the gain of the AGC may be set accordingly, i.e., when such signal is received, the gain may be changed up, down or may remain the same. Then to generate the AGC statistics, whenever a sufficiently strong incoming signal is detected, the AGC state information may be recorded. For example, information on whether the AGC has been triggered (i.e., gain changed up or down) or has not been triggered (gain remain the same), the gain level, and the like can be recorded.

While the AGC statistics should include the AGC events triggered due to the interfering signals, the statistics should not include AGC events triggered due to other signals. However, the AGC is not necessarily an intelligent function. It can and does change its state due to incoming signals that are beyond its target. For example, the base station's AGC may be triggered by signals from its own users. That is, the AGC may be triggered due to signals transmitted from UEs currently being served by the base station. Referring back to FIG. 1, the AGC may be triggered by the signals represented by the solid lines. These "own" signals should not be mitigated, and thus, should not be included in the AGC statistics being used to identify the interferences.

Thus, in an aspect, the AGC statistics of the AGC events are generated based on the base station's AGC behavior in combination with the base band (BB) processing. This process may be explained generally as follows. Supervising the AGC behavior can identify the incoming signals that are strong enough to be potentially interfering, i.e., interference candidates can be identified. Using the base band processing, each potentially interfering signal can be identified as being an own signal or not. The AGC statistics can be generated based on the signals that are identified as not own signals.

Figure 6:
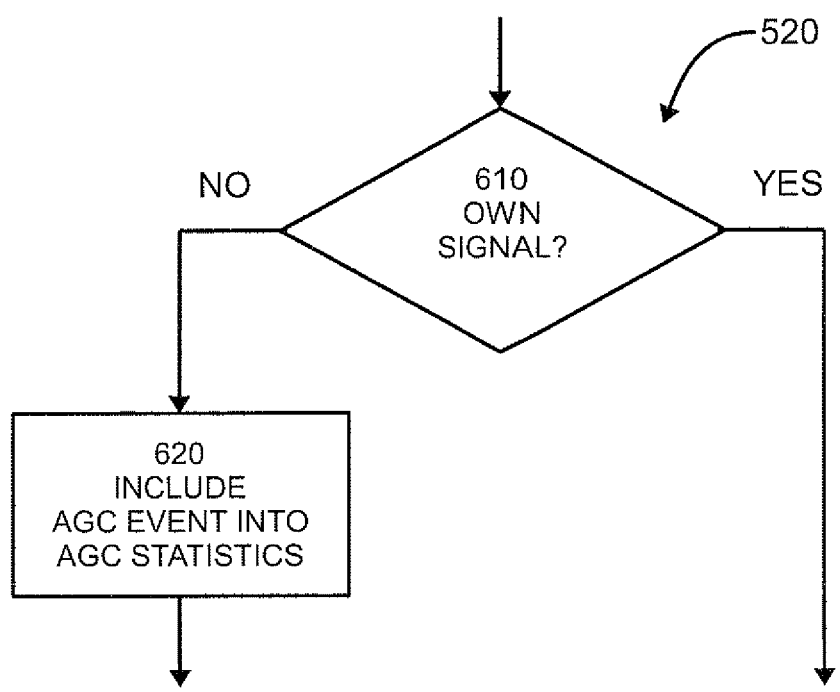
FIG. 6 illustrates an example method to generate AGC statistics.

FIG. 6 illustrates an example process to implement step 520 to generate the AGC statistics. As seen, the process 520, which is performed for each incoming signal associated with an AGC event, comprises:

determining whether or not the incoming signal is an own signal based on the base band processing (step 610); and including the AGC events associated with the incoming signals that are not own signals into the AGC statistics (step 620).

In one aspect, steps 610 and 620, as well as the method 500 in general are RAT specific. Recall that with regard to FIG. 1, the solid lines represent signals from UEs directed to the respective base stations. One should keep in mind however that each solid line is a communication signal in a particular RAT. Thus, in a mixed RAT base station, two signals—e.g. first and second—may be directed to the same base station using corresponding first and second RATs. However, the first signal will be an interfering signal from the perspective of the second RAT and vice versa. Thus, in one aspect, an "own signal" may be defined as a signal transmitted from a UE being served by the base station using the RAT corresponding to the BB processing.

Figure 7:
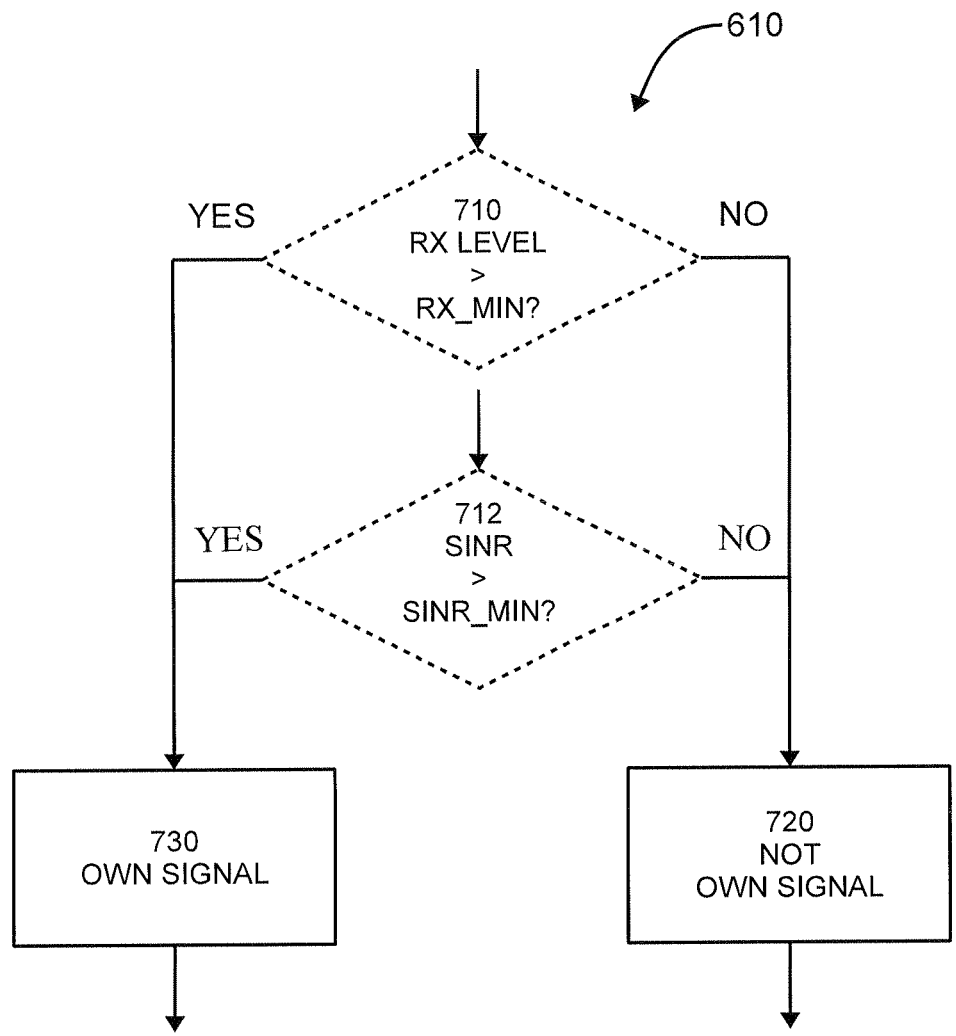
FIG. 7 illustrates an example method to use base band processing to identify own user transmissions.

FIG. 7 illustrates an example process to implement step 610 to determine whether the incoming signal is an own signal. FIG. 7 illustrates the use of some specific example ways of using the base band processing to identify own signals. It should be noted that any one or combination of such ways may be used. These are illustrated as dashed flow chart items in the figure.

As seen FIG. 7, one of the ways is to determine whether the RX power levels on the resource blocks (RB) of the incoming signal are above a RX_MIN threshold (step 710). If so, the incoming signal is determined to be an own signal (step 730). Otherwise, it is not (step 720).

The logic is as follows. Assume that the base band processing is an LTE base band processing. If the incoming signal is an LTE uplink signal from an UE being served by the base station 220, the LTE base band processing at the base station 220 would reveal a high RX power content in the resource blocks. The RX power should be above some minimum level—RX_MIN—that would allow the LTE symbols to be properly extracted. However, if the incoming signal is transmitted using a different RAT such as WCDMA, the LTE base band processing would likely show very low RX powers in the resource blocks regardless of whether the incoming signal is from a UE being served by the same base station 200.

Alternatively, whether or not the incoming signal is an own signal can be determined based upon whether the base band processing shows the SINR level is above a SINR_MIN threshold (step 712). The logic here is that the LTE base band processing of an LTE signal would have a very high signal power level relative to any interference or noise level. However, the same LTE base band processing of a WCDMA signal would not reveal such a high SINR level. Instead of SINR, SNR (signal-to-noise ratio) and SNR_MIN threshold may be used.

Note that both steps 710 and 712 are still valid for the scenario in which a transmission from a UE directed to its serving base station is strong enough to cause an AGC event at a non-serving base station. In the case of step 710 of using the RX power levels, LTE is used as an example RAT in which it is assumed that LTE reference symbols (RS) transmitted by a UE causes an AGC event at a non-serving base station. Since the RS is incorrect from the perspective of the non-serving base station, the energy of the RS will only be seen as noise when the base band processing is performed. Hence, the UE transmission will be correctly identified as not being an own signal at the non-serving base station.

Regarding step 712 of using SINR levels, it is normally the case that the signals from UEs being served by the base station will have higher SINR levels than signals from other UEs. Thus, by setting the SINR_MIN threshold appropriately, own signals in the RAT may be readily identified.

Between the two, using RX power levels may be more preferable. One drawback of using SINRs is that it may be somewhat difficult to determine whether a received signal is an own signal when there is a simultaneous reception of an own signal and an interfering signal of roughly equal magnitude. But it should also be noted that steps 710 and 712 may be used in combination to determine whether the incoming signals are from own users or not.

By collecting and processing the AGC statistics, it is possible to identify the interferences, i.e., their power levels and locations. In this context, locations refer to the frequencies of the interfering signals. This information can be used a basis for deciding which mitigation solution is the most suitable way to mitigate the performance degradation. There are a number of possible mitigation solutions as will be seen below.

Figure 8:
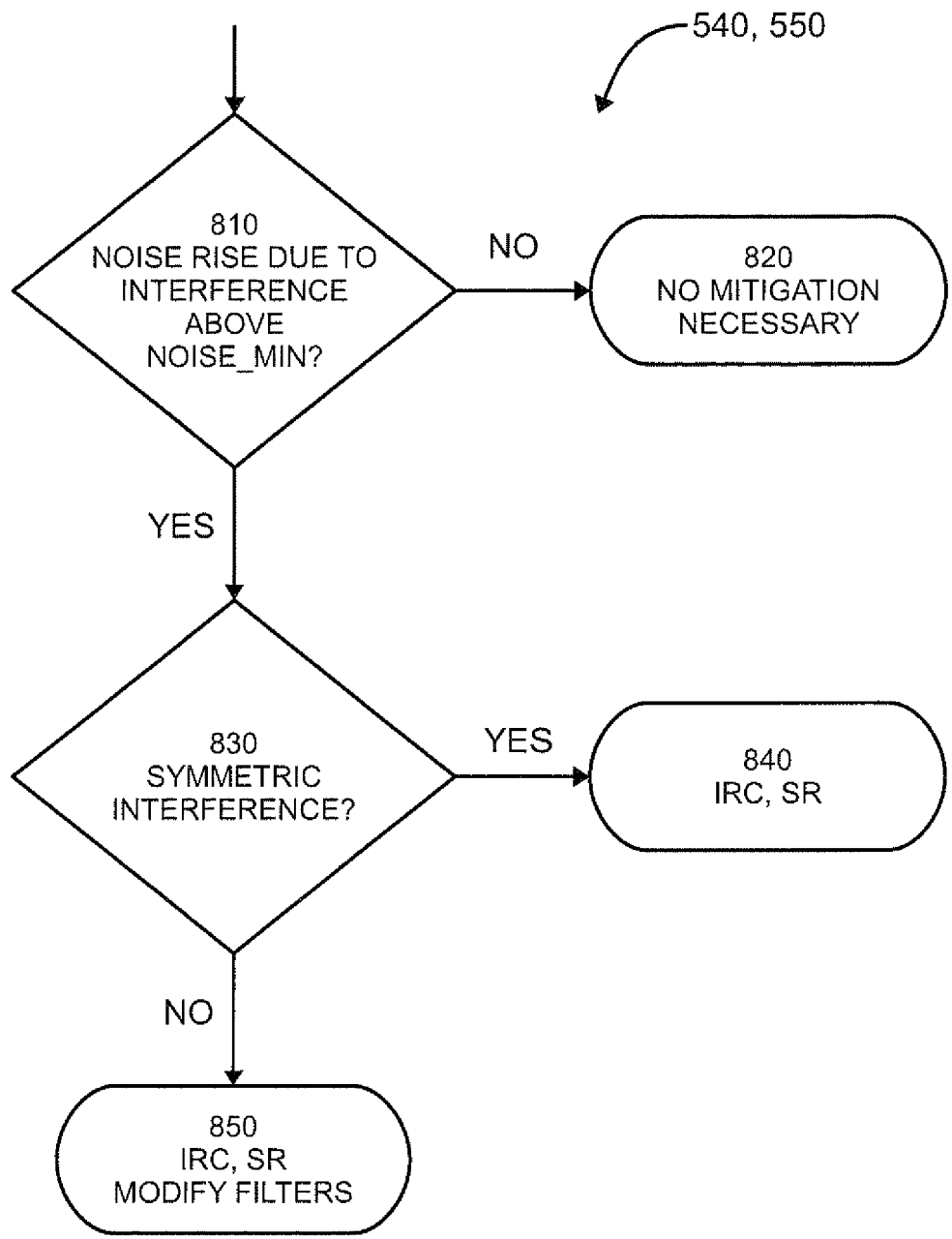
FIG. 8 illustrates an example method to evaluate performance degradations and to propose mitigation solutions.

Referring back to FIG. 5, once the interferences are identified from the AGC statistics in step 530, performance degradation due to the interferences is evaluated in step 540 and mitigation solutions are proposed in step 550. FIG. 8 illustrates an example process to implement steps 540 and 550. As seen, the process comprises:

determining whether or not a noise rise due to the interference is above a NOISE_MIN threshold (step 810); and when the noise rise is not above the NOISE_MIN threshold, determining that no mitigation strategy is necessary (step 820).

This is a recognition that when the interference level is tolerable, mitigation actions are not necessary. Note that whether or not the interference level or noise rise is from the perspective of the particular RAT operating at the base station.

The process further comprises:

when the noise rise is above the NOISE_MIN threshold, determining whether or not the interference is symmetric (step 830);

when the interference is symmetric, proposing as possible mitigation solutions one or both of IRC and scheduling restrictions (step 840); and when the interference is not symmetric, proposing as possible mitigation solutions any combination of IRC, scheduling restrictions, frequency replanning, redirecting antennas, tilting antennas, adding antennas, adding sites, adding repeaters, adding coordinated multipoint TX/RX, and filter modifications (step 850).

The types of filter modification include any combination of moving center frequencies of one or more software filters, reconfiguring one or more software filters, reconfiguring one or more hardware filters, and replacing one or more hardware filters.

Figure 9:
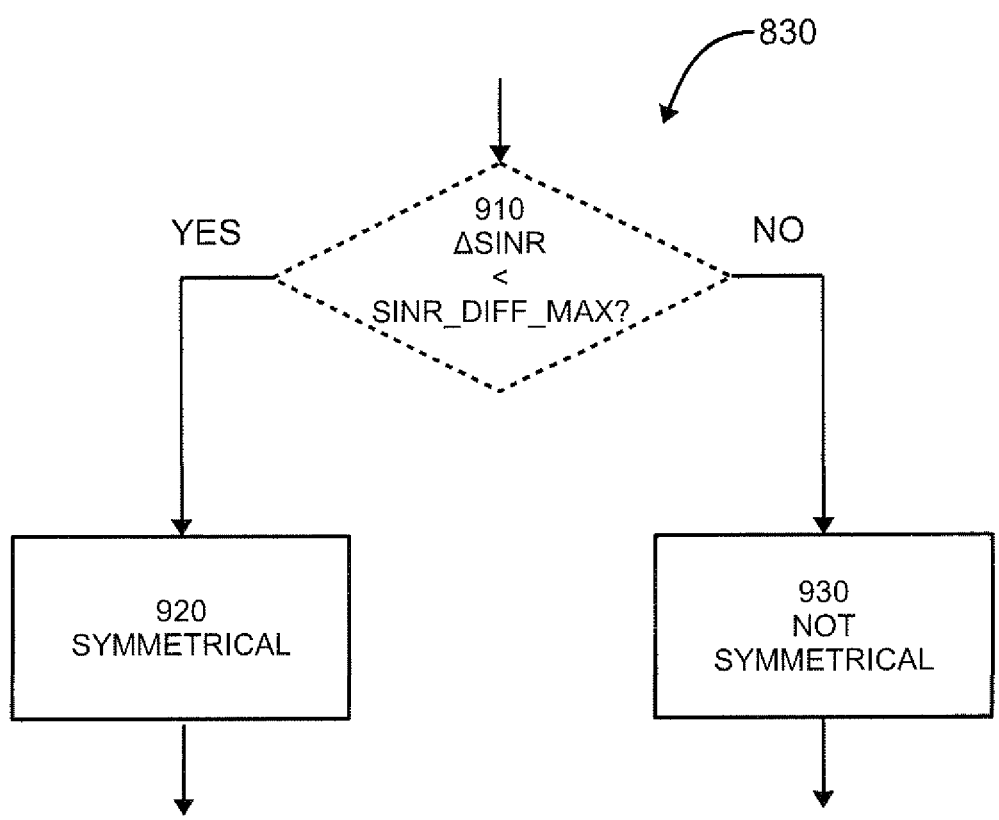
FIG. 9 illustrates an example method to determine whether or not an interference is symmetric.

Regarding step 830, for a channel, identifying the interference location in the frequency domain can be performed based upon asymmetric quality statistics. By determining whether the quality is significantly worse on one side of the channel compared to the other, it can be assumed that the side with worse quality is closer in frequency to the interference. For example, if the quality is worse at the low end frequencies of the channel than at the channel's upper end frequencies, it can be assumed that the frequency of the interference is below the channel, the low end side of the channel is closer to the interference. If there is asymmetry, one way to mitigate is to move the center frequencies of software filters away from the worse quality side and towards the better quality side. FIG. 9 illustrates an example process to implement step 830. As seen, the example process comprises:

determining whether or not a difference in SINRs between one side of a carrier channel and another side is less than a SINR_DIFF_MAX threshold (step 910);

when the difference between the SINRs is less than the SINR_DIFF_MAX threshold, determining that the interference is symmetrical (step 920); and when the difference between the SINRs is not less than the SINR_DIFF_MAX threshold, determining that the interference is not symmetrical (step 930).

The carrier channel refers to the carrier channel of the RAT. Here, the SINR measurements on the PUSCH (Physical Uplink Shared Channel) per RB (Resource Block) can be used as an indication of such asymmetric interference. Alternatively, separate SINR statistics on each side on the PUCCH (Physical Uplink Control Channel) can be analyzed. Again, SNRs may be used.

Note that the method 500 illustrated in FIGS. 5-9 is also applicable to a single RAT base station since the interferences from the perspective of the RAT are identified and solutions are proposed in the method.

Figure 10:
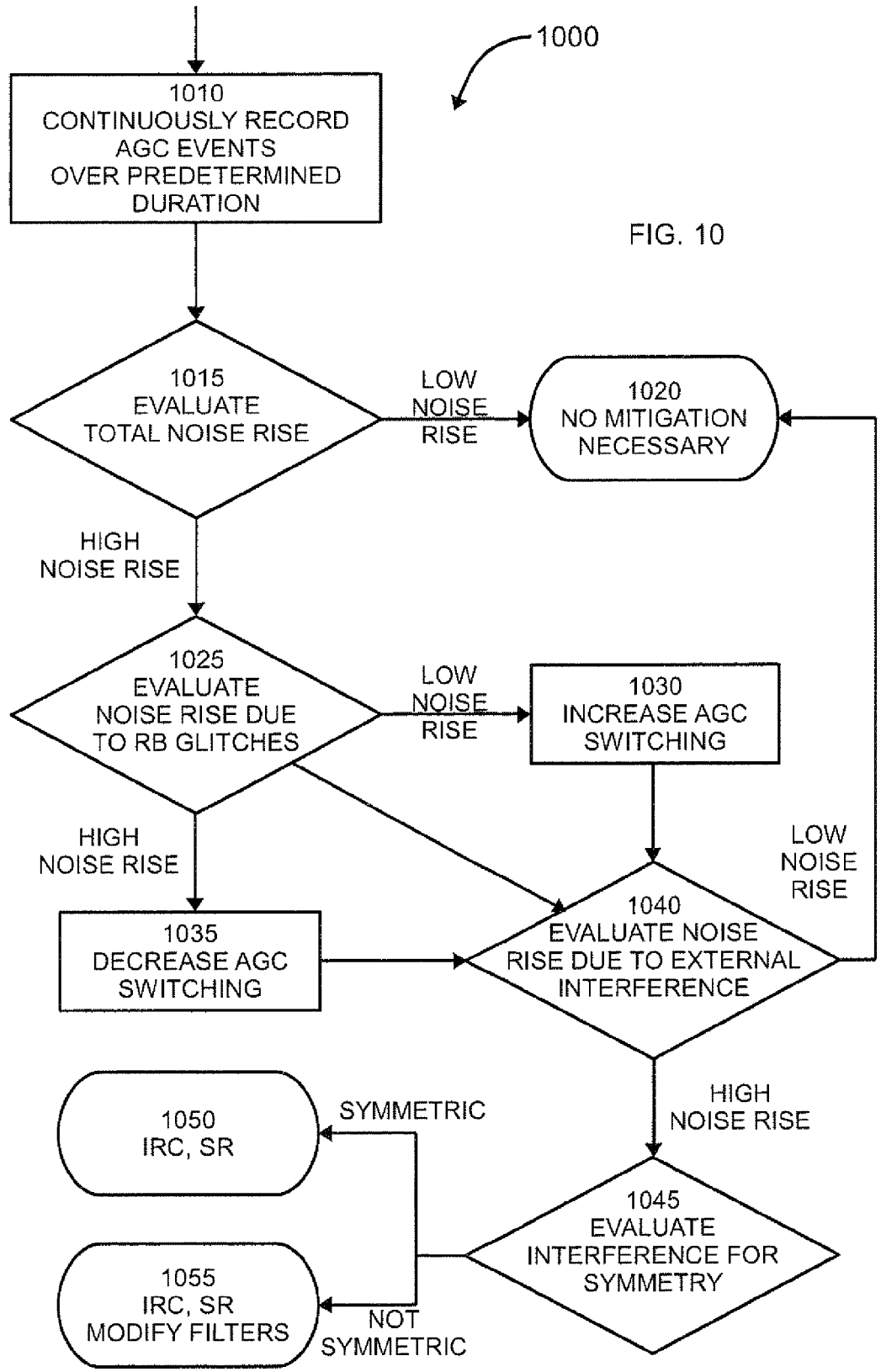
FIG. 10 illustrates another example method to identify and mitigate interferences.

FIG. 10 illustrates another example method 1000 to identify and mitigate interferences for a RAT operating at a base station 200. The method 1000 comprises:
- continuously recording AGC events over a predetermined duration (step 1010); and
- evaluating a total noise rise based on the AGC events (step 1015); and
- when the evaluation in step 1015 indicates the total noise rise is not above a TOTAL_NOISE_MIN threshold, determining that no mitigation strategy is necessary (step 1020).

In step 1015, the total amount of interference experienced at the base station 200—inclusive of all RATS operating at the base station—is considered. Note that whenever an AGC event is triggered at the base station, the change in the AGC is related to the amount of interference experienced at the base station. Thus, step 1015 can be performed simply by calculating the total interferences based on the AGC events without regard to the source of the AGC triggering signal, i.e., without the need to determine whether or not the AGC triggering signals are signals from UEs being served by the base station. Step 1020 is a recognition that when the sum of the interferences experienced at the base station is tolerable, then it should also be tolerable for each RAT operating at the base station.

The method 1000 also comprises:
- when the evaluation in step 1015 indicates that the total noise rise is above the TOTAL_NOISE_MIN threshold, evaluating a noise rise due to RIB glitches (step 1025);
- when the evaluation in step 1025 indicates that the noise rise due to the RB glitches is less than a GLITCH_NOISE_MIN threshold, increasing the AGC switching rate (step 1030); and
- when the evaluation in step 1025 indicates that the noise rise due to the RB glitches is greater than a GLITCH_NOISE_MAX threshold, then decreasing the AGC switching rate (step 1035).

In step 1025, it is determined whether the AGC of the base station is switching too slowly (below GLITCH_NOISE_MIN) or too quickly (above GLITCH_NOISE_MAX). Whenever the AGC triggers, i.e. switches, the triggering can add to the noise. However, if the AGC switching levels are too conservative so that the AGC switches very infrequently, the AGC may not be adapting sufficiently, which can also result in more noise being added. Thus, there is a trade off to be made, which can be done by setting the thresholds GLITCH_NOISE_MIN and GLITCH_NOISE_MAX. Of course, the AGC switching rate may not need to be changed as indicated by the arrow leading from step 1025 to 1040.

The method 1000 further comprises:
- evaluating the noise rise due to external interferences (step 1040); and
- when the evaluation in step 1040 indicates that the noise rise due to the external interferences is less than the NOISE_MIN threshold, determining that no mitigation strategy is necessary (step 1020).

While steps 1015 and 1025 evaluate the noise rise experienced at the base station 200 as a whole, in step 1040, the noise rise is evaluated from the perspective of an individual RAT operating at the base station. Thus, step 1040 followed by step 1020 can be viewed as corresponding to steps 810 and 820 of FIG. 8.

The method 1000 yet further comprises:
- when the evaluation in step 1040 indicates that the noise rise due to the external interferences is greater than the NOISE_MIN threshold, evaluating the interference for symmetry (step 1045);
- when the evaluation in step 1045 indicates that the interference is symmetric, proposing as possible mitigation solutions one or both of IRC and scheduling restrictions (step 1050); and
- when the evaluation in step 1045 indicates that the interference is symmetric, proposing as possible mitigation solutions any combination of IRC, scheduling restrictions, frequency replanning, redirecting antennas, tilting antennas, adding antennas, adding sites, adding repeaters, adding coordinated multipoint TX/RX, and filter modifications (step 1055).

Steps 1045, 1050 and 1055 may be viewed as corresponding to steps 830, 840 and 850 of FIG. 8. Like the method 500, the method 1000 is also applicable to a single RAT base station.

In a mixed RAT, different standards functionality is based on frequency multiplexing. In a mixed RAT mode defined by 3GPP, the radio unit handles at least two RATs both in TX and RX chains simultaneously. Radio chains include different components performing functions such as filtering, signal amplification, up/down RF conversion to/from base band frequency and gain control among others.

Figure 11:
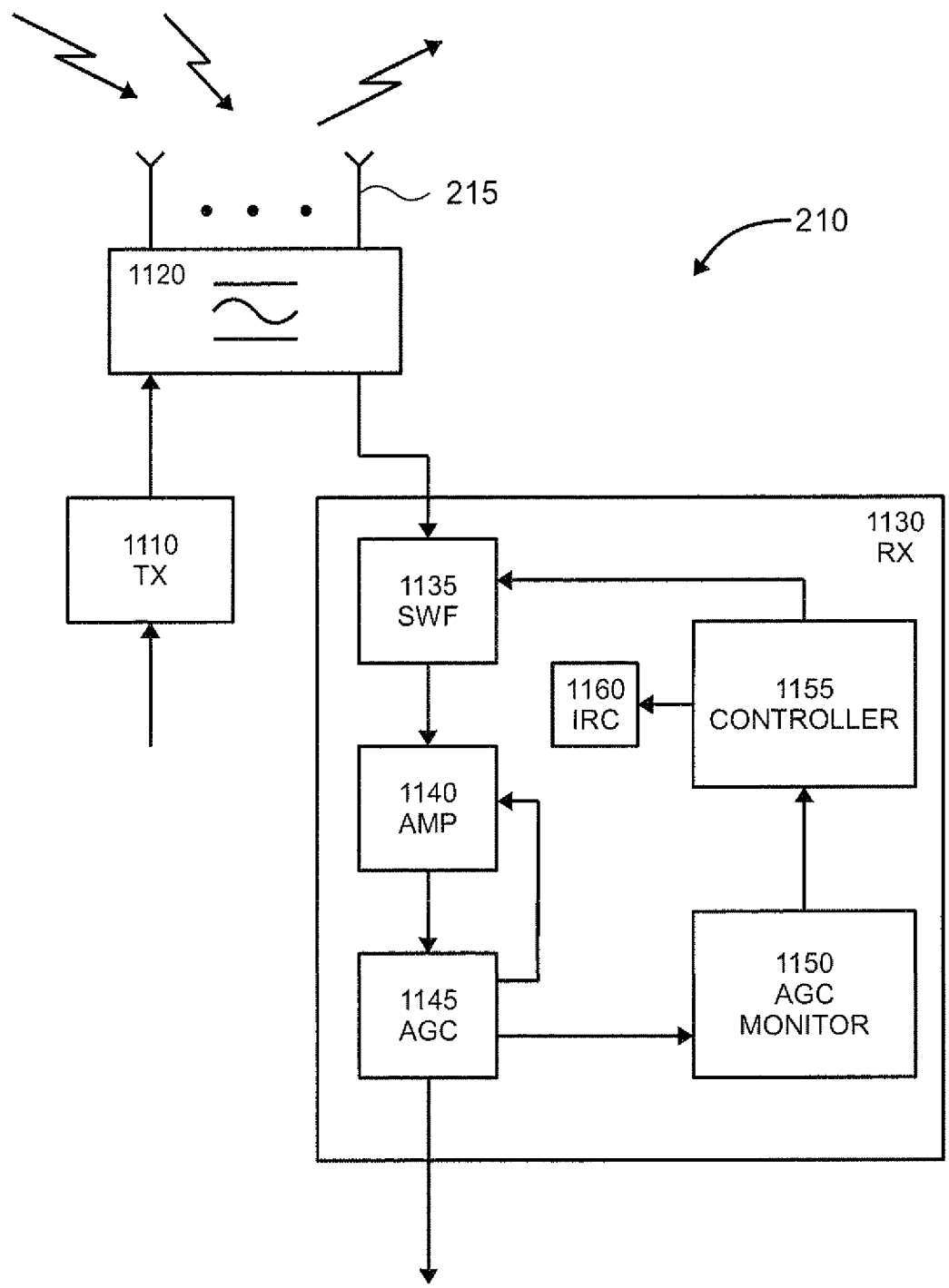
FIG. 11 illustrates an example multi-standard radio.

FIG. 11 illustrates an example MSR unit 210 capable of operating in the mixed RAT mode. The MSR unit 210, which can also be referred to as a transceiver, includes a transmitter 1110 and a receiver 1130. A duplexor 1120, which includes at least a band pass filter, separates outgoing signals received from the transmitter 1110 from incoming signals to be forwarded to the receiver 1130. The details of the transmitter 1110 are omitted for sake of clarity.

Figure 12:
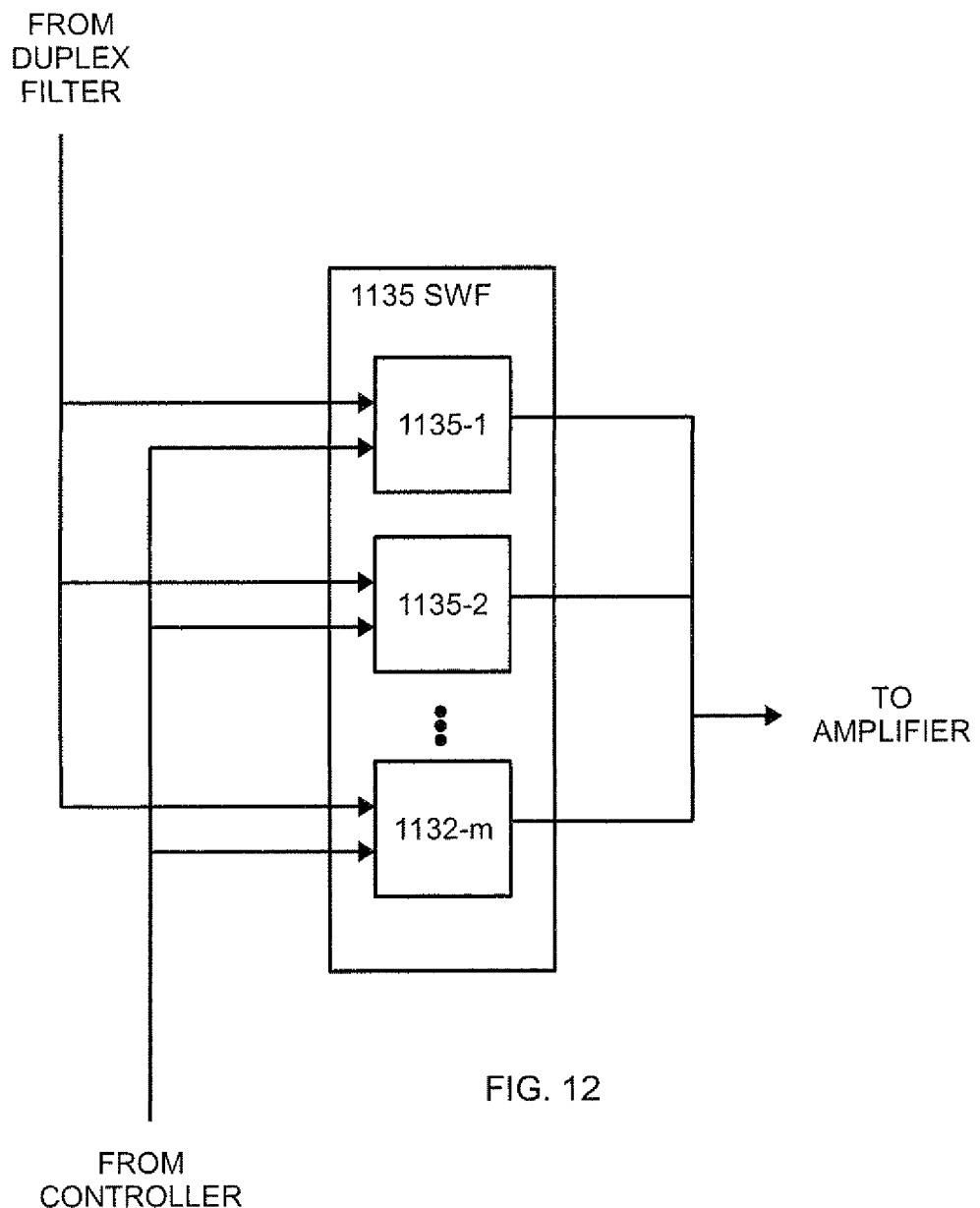
FIG. 12 illustrates an example of software or software configurable filters.

The receiver 1130 includes one or more filters 1135. As illustrated in FIG. 12, each of the filters 1135-1 . . . 1135-$m$ can be implemented in software or can be software configurable. As such, their behaviors can be modified via software methods, which can be used as one way of interference mitigation for each of the RATs in steps 840, 850, 1050 and 1055. For each RAT, zero, one or more filters may be configurable interference mitigation. When each filter 1135 is associated with each RAT, then the number of filters 1135 will equal the number of RATs (m=n) operating in the base station 200.

Referring back to FIG. 11, the receiver 1130 also includes an amplifier 1140, an AGC unit 1145, an AGC monitor 1150, and a controller 1155. The AGC unit 1145 is arranged to control the gain of at least one amplifier 1140 with a closed-loop feedback. The AGC monitor 1150 is arranged to monitor the AGC's 1145 activities and other relevant parameters such as SINR (signal-to-interference-noise-ratio) to the controller 1155. The controller 1155, is arranged to identify and mitigate interferences as will be further described in detail below.

For clarity, much of the typical RX functionalities such as front end processing (low noise amplification, analog filtering, etc.), A/D conversion, frequency mixing, channel estimation, and the like are omitted from the receiver 1130 block diagram.

Figure 13:
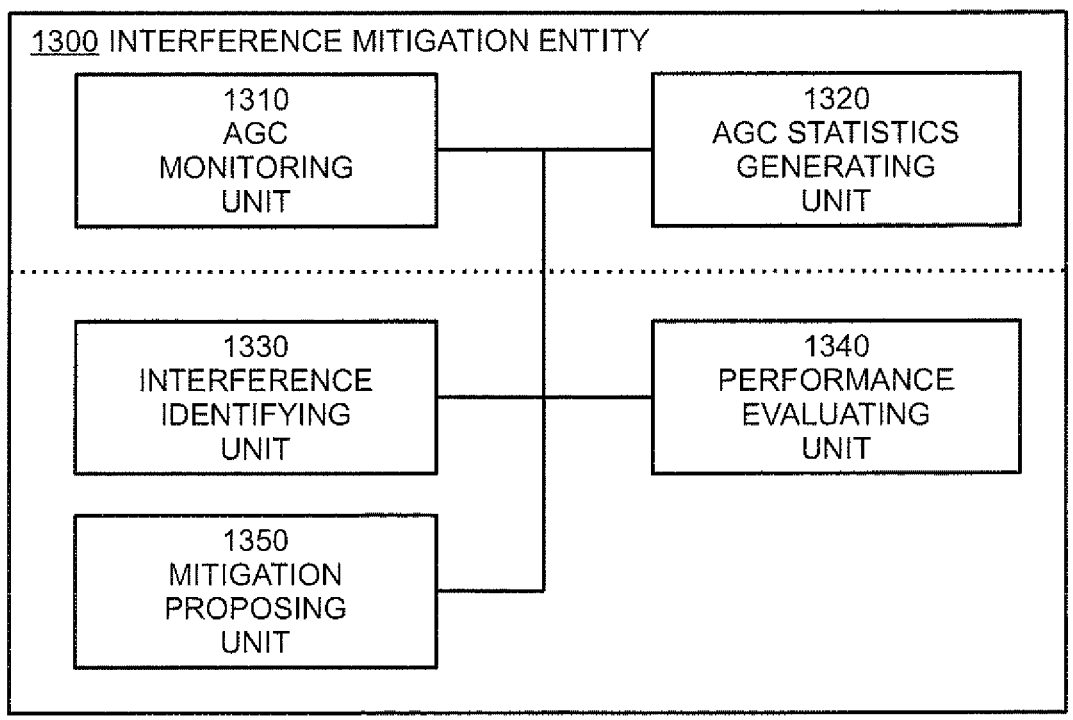
FIG. 13 illustrates an example interference mitigation entity which identifies and mitigates interferences of base stations.

FIG. 13 illustrates an example interference mitigation entity 1300 which identifies and mitigates interferences of one or more base stations. The entity 1300 comprises:
- an AGC monitoring unit 1310 arranged to monitor AGC events occurring at the base station 200 due to incoming signals over a predetermined time duration;
- an AGC statistics generating unit 1320 arranged to generate AGC statistics of the AGC events in combination with base band processing of a RAT operating in the base station 200;
- an interference identifying unit 1330 arranged to identify an interference based on the AGC statistics;

a performance evaluating unit 1340 arranged to evaluate a performance degradation at the base station 200 due to the identified interference; and a mitigation proposing unit 1350 arranged to propose one or more interference mitigation solutions based on the performance degradation.

The functions these units perform correspond to the steps 510-550 of FIG. 5. Thus, further detailed description of the individual units is omitted.

It should be noted that the units of the interference mitigation entity 1300 can be implemented in a single node or can be distributed over multiple nodes of the wireless network system. In one example implementation, the AGC monitoring unit 1310 and the AGC statistics generating unit 1320 may reside locally at the base station 200 and the interference identifying unit 1330, the performance evaluating unit 1340 and the mitigation proposing unit 1350 may reside at an Operational Support System (OSS). This example separation is illustrated by a dashed line in FIG. 13.

Figure 14:
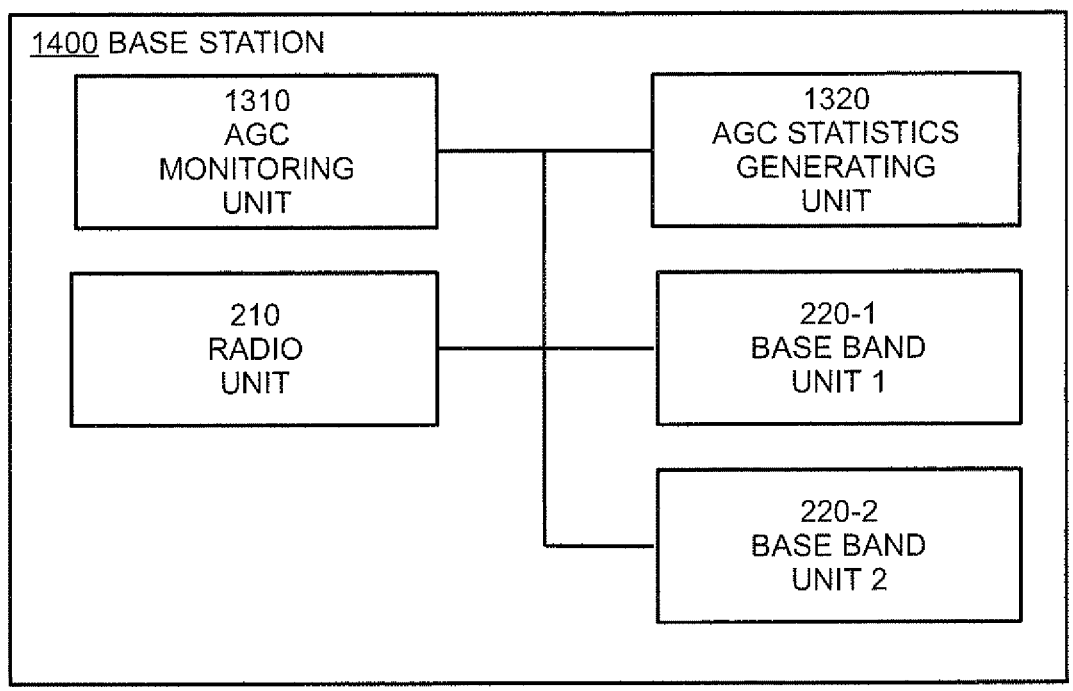
FIG. 14 illustrates an example base station with AGC monitoring and AGC statistics generating capabilities.

An example of a base station with AGC monitoring and AGC statistics generating capabilities is illustrated in FIG. 14. Within the base station 1400, the AGC monitoring unit 1310 (which can be the same or different unit from the AGC monitor 1150 in FIG. 11) can forward the AGC events to a processing unit, and the processing unit may remove own triggered events from the AGC statistics for each RAT. Note that the AGC statistics can be separately generated for each RAT. In other words, the AGC statistics generating unit 1320 can generate AGC statistics for each of the first and second RATs corresponding to first and second base band units 220-1, 220-2. For simplicity, only two base band units 220-1, 220-2 are illustrated in this figure. However, it should be noted that the number of base band units can be any number including one (for a single RAT base station).

Figure 15:
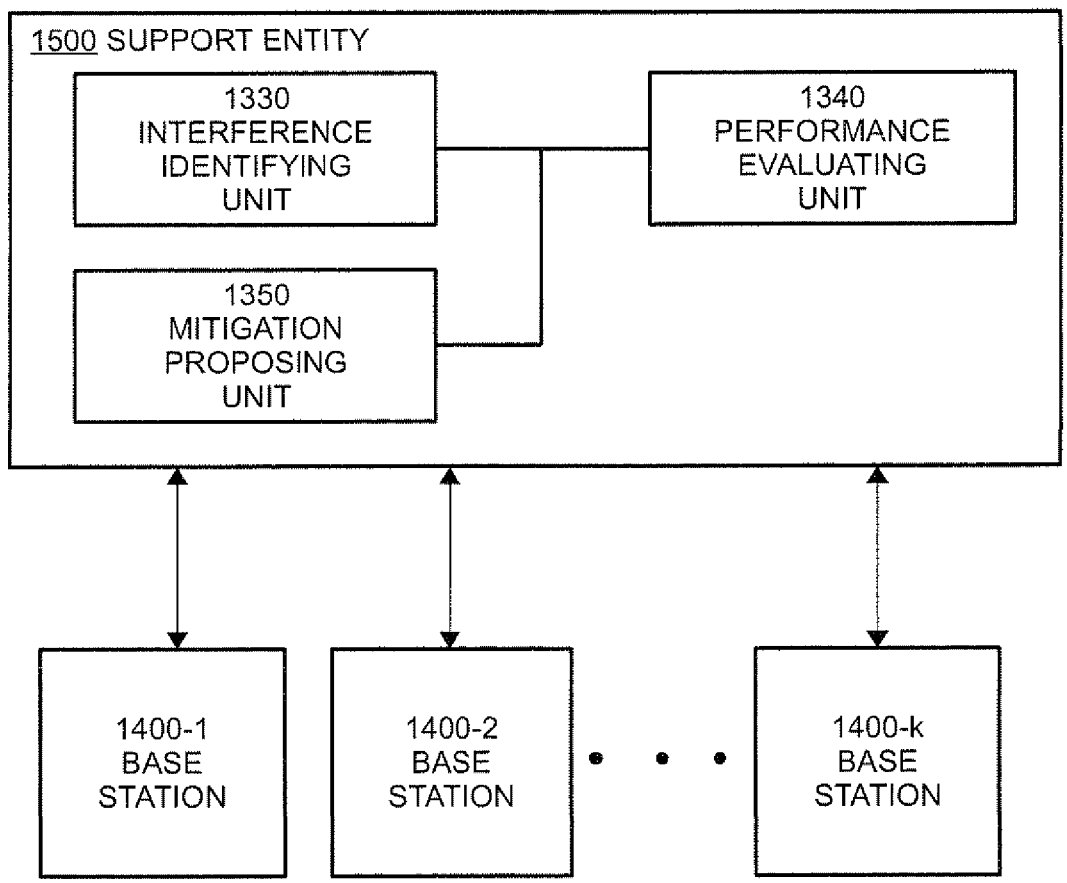
FIG. 15 illustrates an support entity that identifies interferences and proposes mitigation solutions.

The AGC statistics generated for each RAT in the base station 1400 then can be forwarded to the support entity 1500 illustrated in FIG. 15. In this example support entity 1500 (e.g., OSS), the support entity includes the interference identifying unit 1330, the performance evaluating unit 1340 and the mitigation proposing unit 1350. Also as illustrated, each of the multiple base stations 1400 may forward the AGC statistics to the support entity 1550.

A non-exhaustive list of advantages of the disclose subject matter includes:
- Identify interference power levels and locations on already installed base station;
- Propose a variety of solutions for mitigation of interference degradation;
- Better control over interferences;
- New functionality;
- Save cost;
- Simpler filter design; and
- Save design/test time Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at one or more nodes of a wireless communication system to identify and mitigate interferences, the method comprising:
   - monitoring automatic gain control (AGC) events occurring at a base station due to incoming signals over a predetermined time duration, the incoming signals comprising wireless transmissions from one or more base station(s) or one or more user equipment(s);
   - generating AGC statistics of the AGC events in combination with a base band (BB) processing of a radio access technology (RAT) operating in the base station;
   - identifying an interference due to the wireless transmissions from the base stations or the user equipments(s) based on the AGC statistics;
   - evaluating a performance degradation at the base station due to the identified interference; and
   - proposing one or more interference mitigation solutions based on the performance degradation,
   - wherein the AGC statistics include statistics of AGC triggered states and AGC non-triggered states.

2. The method of claim 1,
   - wherein the base station is a mixed RAT base station comprising a multi-standard radio unit capable of communicating with user equipment(s) using at least a first RAT and a second RAT simultaneously, the first and second RATS being different from each other;
   - wherein the multi-standard radio unit includes a duplex filter with a frequency range that is inclusive of operating bands of the first and second RATS; and
   - wherein the BB processing is one of a first RAT BB processing and a second RAT BB processing.

3. The method of claim 1, wherein the step of generating the AGC statistics related to the AGC events comprises:
   - for each incoming signal associated with an AGC event, determining whether or not the incoming signal is an own signal based on the BB processing; and
   - including the AGC events associated with the incoming signals that are not own signals into the AGC statistics,
   - wherein an own signal is a signal transmitted from a user equipment (UE) being served by the base station using the RAT corresponding to the BB processing.

4. The method of claim 3, wherein the step of determining whether or not the incoming signal is an own signal comprises:
   - determining whether or not RX power levels of resources blocks (RB) of the incoming signal are above a RX_MIN threshold; and
   - determining that the incoming signal is not an own signal when it is determined that the RX power levels of the incoming signal are not above the RX_MIN threshold.

5. The method of claim 4, wherein the incoming signals are subjected to BB processing in accordance with the corresponding RAT to determine the RS power levels.

6. The method of claim 3, wherein the step of determining whether or not the incoming signal is an own signal comprises:
   - determining whether or not a signal-to-interference-noise-ratio (SINR) of the incoming signal is above a SINR_MIN threshold; and
   - determining that the incoming signal is not an own signal when it is determined that the SINR of the incoming signal is not above the SINR_MIN threshold.

7. The method of claim 6, wherein the incoming signals are subjected to BB processing in accordance with the corresponding RAT to determine the SINR.

8. The method of claim 1, wherein the step of identifying the interference based on the AGC statistics comprises identifying a power level and a frequency of the interference.

9. The method of claim 1, wherein the steps of evaluating the performance degradation and proposing one or more interference mitigation solutions based on the performance degradation comprise:
  determining whether or not a noise rise due to the interference is above a NOISE_MIN threshold; and
  determining that no mitigation strategy is necessary when it is determined that the noise rise is not above the NOISE_MIN threshold.

10. The method of claim 9, wherein the step of determining whether or not the noise rise due to the interference is above the NOISE_MIN threshold comprises determining the noise rise based on the AGC levels associated with the interferences in the AGC statistics.

11. The method of claim 9 wherein the steps of evaluating the performance degradation and proposing one or more interference mitigation solutions based on the performance degradation further comprise:
  determining whether or not the interference is symmetric when it is determined that the noise rise is above the NOISE_MIN threshold;
  proposing as possible mitigation solutions, when it is determined that the interference is symmetric, one or both of an interference rejection combining and scheduling restriction; and
  proposing as possible mitigation solutions, when it is determined that the interference is not symmetric, any one or more of the interference rejection combining, scheduling restriction, frequency replanning, redirecting antennas, tilting antennas, adding antennas, adding sites, adding repeaters, and coordinated multipoint TX/RX, and filter modifications,
  wherein the filter modifications include any one or more of moving center frequencies of one or more software filters, reconfiguring one or more software filters, reconfiguring one or more hardware filters, replacing one or more hardware filters.

12. The method of claim 11, wherein the step of determining whether or not the interference is symmetric comprises:
  determining whether or not a difference between a first SINR on a first side of a carrier channel and a second SINR on a second side of the carrier channel is less than a SINR_DIFF_MAX threshold;
  determining that the interference is symmetrical when it is determined that the difference between the first and second SINRs is less than the SINR_DIFF_MAX threshold; and
  determining that the interference is not symmetrical when it is determined that the difference between the first and second SINRs is not less than the SINR_DIFF_MAX threshold.

13. The method of claim 12, wherein in the step of determining whether or not the difference between the first and second SINRs is less than the SINR_DIFF_MAX threshold comprises determining SINRs based one or both of
  measurements on a Physical Uplink Shared Channel (PUSCH) per resource block, and
  measurements on a Physical Uplink Control Channel (PUCCH) per resource block.

14. An interference mitigation entity of a wireless communication system arranged to identify and mitigate interferences, the interference mitigation entity comprising:
  an AGC monitoring unit arranged to monitor automatic gain control (AGC) events occurring at a base station due to incoming signals over a predetermined time duration, the incoming signals comprising wireless transmissions from one or more base station(s) or one or more user equipment(s);
  an AGC statistics generating unit arranged to generate AGC statistics of the AGC events in combination with a base band (BB) processing of a radio access technology (RAT) operating in the base station;
  an interference identifying unit arranged to identify an interference due to the wireless transmissions from the base station(s) or the user equipment(s) based on the AGC statistics;
  a performance evaluating unit arranged to evaluate a performance degradation at the base station due to the identified interference; and
  a mitigation proposing unit arranged to propose one or more interference mitigation solutions based on the performance degradation,
  wherein the AGC statistics include statistics of AGC triggered states and AGC non-triggered states.

15. The interference mitigation entity of claim 14,
  wherein the base station is a mixed RAT base station comprising a common multi-standard radio unit capable of communicating with user equipment(s) using at least a first RAT and a second RAT simultaneously, the first and second RATS being different from each other;
  wherein the multi-standard radio unit includes a common duplex filter with a frequency range that is inclusive of operating bands of the first and second RATS; and
  wherein the BB processing is one of a first RAT BB processing and a second RAT BB processing.

16. The interference mitigation entity of claim 14, wherein the AGC statistics generating unit is arranged to generate the AGC statistics of the AGC events by:
  for each incoming signal associated with an AGC event, determining whether or not the incoming signal is an own signal of the RAT operating in the base station based on the BB processing; and
  including the AGC events associated with the incoming signals that are not own signals into the AGC statistics,
  wherein an own signal is a signal transmitted from a user equipment (UE) being served by the base station using the RAT corresponding to the BB processing.

17. The interference mitigation entity of claim 16, wherein the AGC statistics generating unit is arranged to:
  determine whether or not RX power levels of resources blocks (RB) of the incoming signal are above a RX_MIN threshold; and
  determine that the incoming signal is not an own signal when it determines that the RX power levels of the incoming signal are not above the RX_MIN threshold.

18. The interference mitigation entity of claim 17, wherein the incoming signals are subjected to BB processing in accordance with the corresponding RAT to determine the RS power levels.

19. The interference mitigation entity of claim 16, wherein the AGC statistics generating unit is arranged to:
  determine whether or not a signal-to-interference-noise-ratio (SINR) of the incoming signal is above a SINR_MIN threshold; and determine that the incoming signal is not an own signal when it determines that the SINR of the incoming signal is not above the SINR_MIN threshold.

20. The interference mitigation entity of claim 19, wherein the incoming signals are subjected to BB processing in accordance with the corresponding RAT to determine the SINR.

21. The interference mitigation entity of claim 14, wherein the interference identifying unit is arranged to identify a power level and a frequency of the interference based on the AGC statistics.

22. The interference mitigation entity of claim 14,
wherein the performance evaluating unit is arranged to evaluate the performance degradation by determining whether or not a noise rise due to the interference is above a NOISE_MIN threshold, and
wherein the mitigation proposing unit is arranged to determine that no mitigation strategy is necessary when the performance evaluating unit determines that the noise rise is not above the NOISE_MIN threshold.

23. The interference mitigation entity of claim 22, wherein the performance evaluating unit is arranged to determine the noise rise based on the AGC levels associated with the interferences in the AGC statistics.

24. The interference mitigation entity of claim 22
wherein the performance evaluating unit is arranged to determine whether or not the interference is symmetric when it determines that the noise rise is above the NOISE_MIN threshold, and
wherein the mitigation proposing unit is arranged to propose as possible mitigation solutions
one or both of an interference rejection combining and scheduling restriction when the performance evaluating unit determines that the interference is symmetric, and
any one or more of the interference rejection combining, scheduling restriction, frequency replanning, redirecting antennas, tilting antennas, adding antennas, adding sites, adding repeaters, and coordinated multipoint TX/RX, and filter modifications, when the performance evaluating unit determines that the interference is not symmetric,
wherein the filter modifications include any one or more of moving center frequencies of one or more software filters, reconfiguring one or more software filters, reconfiguring one or more hardware filters, replacing one or more hardware filters.

25. The interference mitigation entity of claim 24, wherein the performance evaluating unit is arranged to:
determine whether or not a difference between a first SINR on a first side of a carrier channel and a second SINR on a second side of the carrier channel is less than a SINR_DIFF_MAX threshold;
determine that the interference is symmetrical when it determines that the difference between the first and second SINRs is less than the SINR_DIFF_MAX threshold; and
determine that the interference is not symmetrical when it determines that the difference between the first and second SINRs is not less than the SINR_DIFF_MAX threshold.

26. The interference mitigation entity of claim 25, wherein the performance evaluating unit is arranged to determine whether or not the difference between the first and second SINRs is less than the SINR_DIFF_MAX threshold based one or both of
measurements on a Physical Uplink Shared Channel (PUSCH) per resource block, and
measurements on a Physical Uplink Control Channel (PUCCH) per resource block.

27. The interference mitigation entity of claim 14, wherein the AGC statistics generating unit generates separate AGC statistics for each RAT operating in the base station.

28. The interference mitigation entity of claim 27,
wherein the AGC monitoring unit and the AGC statistics generating unit are included in each of one or more base stations; and
a support entity (1500) comprises the interference identifying unit, the performance evaluating unit, and the mitigation proposing unit,
wherein the support entity (1500) is a separate node from the one or more base station, and
wherein each base station forwards the AGC statistics of each RAT operating in the base stations to the support entity (1500).

29. A non-transitory computer storage medium storing therein programming instructions, which when executed by a computer, the computer executes a method to identify and mitigate interferences occurring at a base station of a wireless communication system, the method comprising:
monitoring automatic gain control (AGC) events occurring at the base station due to incoming signals over a predetermined time duration, the incoming signals comprising wireless transmissions from one or more base station(s) or one or more user equipment(s);
generating AGC statistics of the AGC events in combination with a base band (BB) processing of a radio access technology (RAT) operating in the base station;
identifying an interference due to the wireless transmissions from the base station(s) or the user equipment(s) based on the AGC statistics;
evaluating a performance degradation at the base station due to the identified interference; and
proposing one or more interference mitigation solutions based on the performance degradation,
wherein the AGC statistics include statistics of AGC triggered states and AGC non-triggered states.

* * * * *

UNITED STATES PATENT AND TRADEMARK OFFICE
CERTIFICATE OF CORRECTION

PATENT NO. : 8,805,284 B2  Page 1 of 2
APPLICATION NO. : 13/034467
DATED : August 12, 2014
INVENTOR(S) : Nejatian et al.

It is certified that error appears in the above-identified patent and that said Letters Patent is hereby corrected as shown below:

In the Specification

In Column 1, Line 11, delete "International. Application." and insert -- International Application --, therefor.

In Column 1, Line 13, delete "herein." and insert -- herein --, therefor.

In Column 3, Line 60, delete "DESCRIPTION" and insert -- BRIEF DESCRIPTION --, therefor.

In Column 5, Line 29, delete "RATS." and insert -- RATs. --, therefor.

In Column 5, Line 58, delete "RATS," and insert -- RATs, --, therefor.

In Column 6, Line 7, delete "common is" and insert -- common way is --, therefor.

In Column 11, Line 13, delete "RATS" and insert -- RATs --, therefor.

In Column 11, Line 29, delete "RIB" and insert -- RB --, therefor.

In Column 12, Line 27, delete "duplexor" and insert -- duplexer --, therefor.

In Column 13, Line 54, delete "time" and insert -- time. --, therefor.

In the Claims

In Column 14, Line 18, in Claim 1, delete "stations" and insert -- station(s) --, therefor.

In Column 14, Line 31, in Claim 2, delete "RATS" and insert -- RATs --, therefor.

Signed and Sealed this
Fourth Day of August, 2015

Michelle K. Lee
*Director of the United States Patent and Trademark Office*

CERTIFICATE OF CORRECTION (continued)
U.S. Pat. No. 8,805,284 B2

In Column 14, Line 34, in Claim 2, delete "RATS;" and insert -- RATs; --, therefor.

In Column 16, Line 32, in Claim 15, delete "RATS" and insert -- RATs --, therefor.

In Column 16, Line 36, in Claim 15, delete "RATS;" and insert -- RATs; --, therefor.

In Column 18, Line 22, in Claim 28, delete "(1500)".

In Column 18, Line 25, in Claim 28, delete "(1500)".

In Column 18, Line 30, in Claim 28, delete "(1500).".